United States Patent [19]
Riker

[11] Patent Number: 4,578,189
[45] Date of Patent: Mar. 25, 1986

[54] SLUDGE SETTLING PLANT
[75] Inventor: Rudolf Riker, Memmingen, Fed. Rep. of Germany
[73] Assignee: Stetter GmbH, Memmingen, Fed. Rep. of Germany
[21] Appl. No.: 644,041
[22] Filed: Aug. 24, 1984
[51] Int. Cl.⁴ .............................................. C02F 11/00
[52] U.S. Cl. ................. 210/253; 210/257.1; 210/533; 405/46
[58] Field of Search ............... 210/170, 515, 523, 521, 210/525, 534, 330, 335, 340, 252, 253, 257.1, 322, 533; 405/46, 101, 100, 52, 53; 52/169.8, 7

[56] References Cited

U.S. PATENT DOCUMENTS

| | | | |
|---|---|---|---|
| 3,550,780 | 12/1970 | Velde et al. | 210/170 |
| 3,749,246 | 7/1973 | Hargraves | 210/322 |
| 3,971,791 | 7/1976 | Peters | 210/121 |
| 4,433,055 | 2/1984 | Kany | 210/253 |
| 4,462,903 | 7/1984 | Wettengl | 210/252 |

Primary Examiner—Richard V. Fisher
Assistant Examiner—Sharon T. Cohen
Attorney, Agent, or Firm—Kuhn Muller and Bazerman

[57] ABSTRACT

Two settling tanks are arranged one beside the other and are separated by a walk-in corridor. The settling tanks are defined by four longitudinal walls, one end wall, and two ramps, which are disposed opposite said end wall. Two additional tanks are provided on the opposite side of the end wall. The longitudinal walls carry overflow weirs, which are continued on the outside by discharge troughs, which open into the tank. Owing to the large effective length of the overflow weirs the overflow velocity is low and the settling effect is high.

8 Claims, 6 Drawing Figures

SLUDGE SETTLING PLANT

This invention relates to a sludge settling plant comprising a plurality of settling tanks, which are connected in parallel in the flow path, and overflow weirs, which are disposed between the settling tanks. Such sludge settling tanks are used for purposes of environmental protection, e.g., in the stone and earth processing industry, in the ceramic industry and in the industry producing ready-mixed concrete. The sludge-containing water is usually supplied to the settling tank on one side and water having a lower solids content is withdrawn over the overflow weir on the opposite side. The water flows through a plurality of tanks, and its content of suspended solids decreases from tank to tank. Whereas a major part of the solids settles in the first tank, a disadvantage resides in that the suspended solids cannot completely settle in the succeeding tanks. A purification of the water in a limited time requires a high structural expenditure.

It is an object of the invention to provide a novel sludge settling plant which permits an improved settling to be achieved in conjunction with a limited structural expenditure.

This object is accomplished in accordance with the invention in that at least two of the settling tanks are disposed one beside the other and are defined by at least three parallel longitudinal walls, a continuous end wall and upwardly inclined ramps disposed opposite to said end wall, an inlet duct is provided for each settling tank and extends along the end wall and is formed with spaced apart outlet openings disposed above the settling tank, the inlets of the inlet ducts are connected by at least one valve to a common supply line, and at least one overflow weir and one discharge trough extend along at least part of the length of each longitudinal wall.

Because the total length of the overflow weirs is substantially increased whereas the cubic capacity of the settling plant is not increased, the velocity of flow across the weirs is reduced to a fraction of an order of 5 to 10% of the values which have previously been usual. As the ability of suspended solids to settle is inversely porportional to the velocity of flow, the settling tanks have a greatly improved settling effect. In the processing of sludges which contain solids having a particle size not in excess of 0.2 mm in the settling plant in accordance with the invention, 95 to 97% of the solids will settle in the primary settling tanks. The water leaving the settling tanks has been purified in a high degree, and it is usually sufficient to provide a single additional collecting tank, from which clarified water can be withdrawn.

In general, the provision of the settling tanks on both sides of a transversely extending end wall results in a compact arrangement having a very high processing capacity. An important feature resides in that the incoming sludge-containing water is supplied adjacent to the partition and the substantially purified water is withdrawn through that end wall in the opposite direction.

The invention will be described in more detail with reference to the drawing, which shows an illustrative embodiment.

Figure 1:
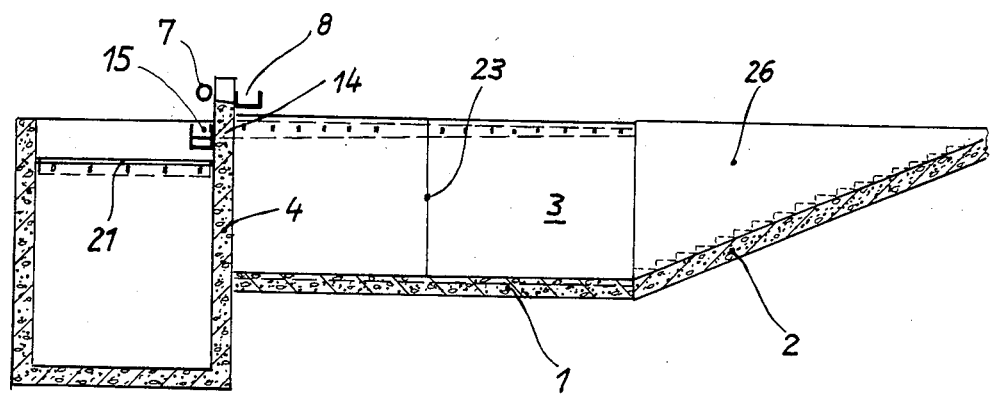
FIG. 1 is a vertical longitudinal sectional view taken on line 1—1 in FIG. 2 and showing a settling plant.

A compact settling plant comprises two juxtaposed settling tanks 1, which are connected in parallel and are continued by ramps 2, which are trafficable from one end. The settling tanks 1 are defined at the opposite end by an end wall 4. The settling tanks 1 are laterally defined by longitudinal walls 3. A man-sized corridor 22 is provided between the settling tanks 1. It is apparent that the two settling tanks 1 connected in parallel are defined by four longitudinal walls 3. Two smaller tanks 5, 6 are provided on the opposite side of the end wall 4 and are separated from each other by a partition 19, which is parallel to the longitudinal walls 3. A line 7 for supplying sludge-containing water extends along the end wall 4 to the middle thereof and opens into an aperture formed in that end wall 4. That aperture communicates through a valve 9 with two inlet ducts 8, which are secured to the end wall 4 on that surface thereof which defines the settling tanks. From the middle of the end wall 4, the inlet ducts 8 extend above the two settling tanks in an outward direction with a slight inclination. The two inlet ducts 8 are provided with a number of bottom outlets 10, which are spaced apart along the ducts 8 and through which the sludge-containing water is delivered to both settling tanks at the same time so that the two settling tanks 1 are connected in parallel.

Each longitudinal wall 3 consists of at least two prefabricated concrete parts, which are aligned in the longitudinal direction and abut at 23 and have a length of about 5 meters each. The longitudinal walls 3 are continued adjacent to the ramps 2 by triangular longitudinal walls 26, which may be made of cast-in-situ concrete. In the present illustrative embodiment the prefabricated longitudinal walls 3 constitute overflow weirs throughout their length. It will be understood that the length of said overflow weirs can be increased if they extend also along the side walls 26 of the ramps.

It is apparent that each of the two settling tanks 1 having a length of 10 meters is provided with overflow weirs in a total length of 20 meters. Because the two settling tanks 1 are connected in parallel, the total overflow weir length in the novel settling plants is four times the length of a settling tank.

Figure 6:
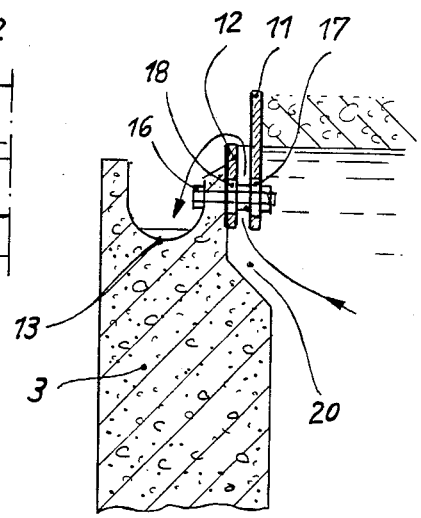
FIG. 6 is a vertical transverse sectional view taken on line 6—6 in FIG. 2.

A discharge trough 13 which is semicircular in cross-section extends along the top of each longitudinal wall 3 and is formed during the manufacture of the prefabricated concrete part. The discharge trough 13 is offset toward the outside of the wall 3 because the longitudinal wall 3 is provided on its inside throughout its length with a recess 20, which accommodates an overflow structure. That overflow structure is shown on a larger scale in FIG. 6 and comprises a bar 12, which extends throughout the length of the longitudinal wall 3 and may also consist of two parts. The bar 12 is provided with vertical slots 18 and fixing screws 16 are provided, which extend through said slots and which also hold a scum-retaining bar 11, which precedes the bars 12 and is spaced from them. These slots permit the two bars to be adjusted in height independently of each other and to a small inclination so that the end of the bars 11, 12 which is nearer to the ramps is about 2 mm lower than the opposite end near the end wall 4 As a result, the sludge-containing water flows in the settling tanks 1 toward the ramps 2, and the bars 12, which constitute the overflow weirs, can be so adjusted that a uniform overflow is achieved throughout the length of the walls 3. The distance between the two bars 11, 12 is in the range of 1 to 5 centimeters and the bar 11 protrudes about 5 cm above the bar 12 so that scum will be effectively retained. The entire assembly comprising the two bars 11, 12 and their fixing screws 16 is accommodated in the recess 20 in the wall so that when sludge is excavated from the settling tanks the buckets of the excavator cannot destroy the bar assembly.

Figure 5:
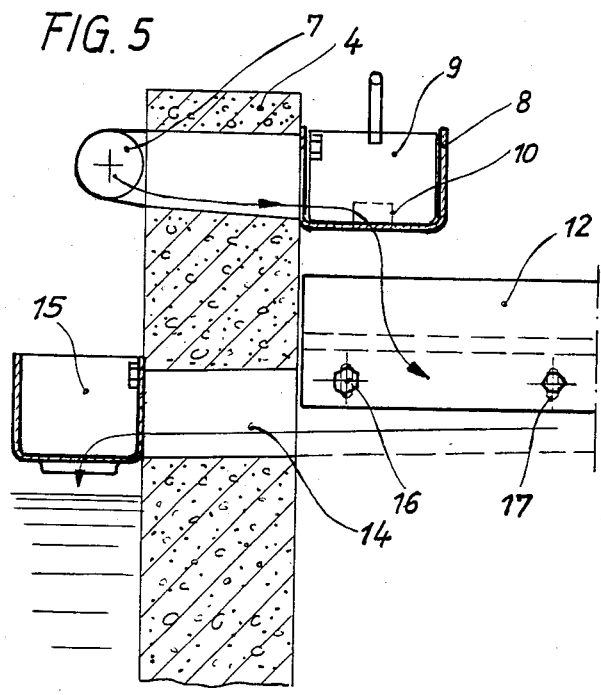
FIG. 5 is a vertical longitudinal sectional view taken on line 5—5 in FIG. 2 and showing a detail on a larger scale.

The end wall 4 is formed for each longitudinal wall 3 with an aperture, which adjoins the end of the associated discharge trough and which directly leads into the collecting tank if a single collecting tank is provided. The plant shown in FIG. 2 comprises two collecting tanks 5, 6, which are separated by a partition 19, and a collecting trough is provided, which extends throughout the length of the end wall 4. On its side remote from the settling tanks 1, the collecting trough is secured to the end wall 4 to extend with a uniform inclination. The four discharge troughs 13 open at the four apertures 14 (FIG. 5) and the latter are connected to the collecting trough by apertures formed in the side wall of the collecting trough 15. The collecting trough 15 discharges into the secondary clarifying tank 5, from which virtually pure water flows across an overflow weir 21 provided on the partition 19 into the pure water tank 6. From the latter, water is removed in known manner through lines 25 by pumps 24.

The valve 9 or a valve 9 for each of the two inlet ducts 8 permit both settling tanks 1 to be supplied at the same time and permits a disconnection of each of the two tanks when the sludge is to be excavated.

Figure 2:
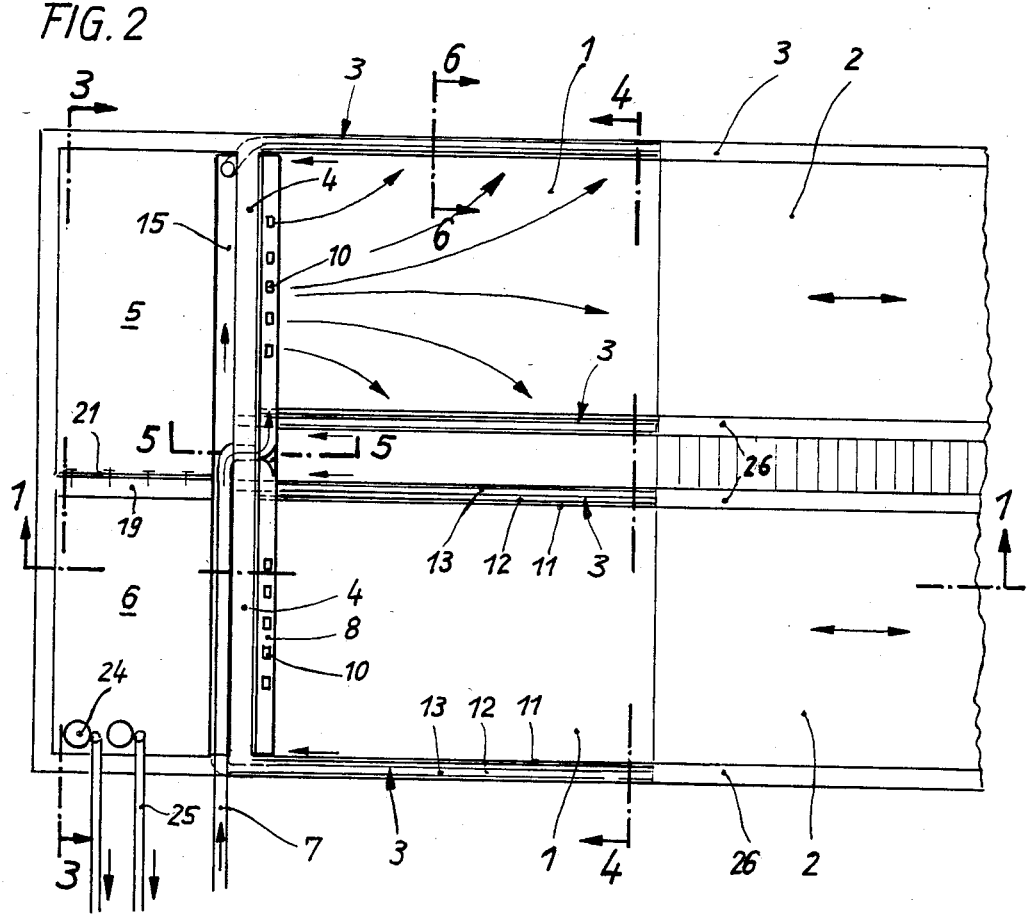
FIG. 2 is a top plan view showing the settling plant of FIG. 1.
Figure 3:
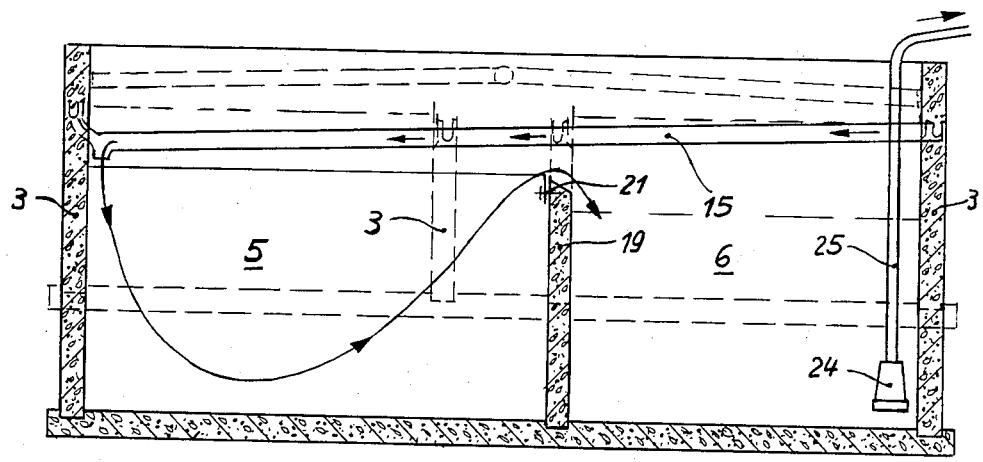
FIG. 3 is a vertical transverse sectional view taken on line 3—3 in FIG. 2 and showing the settling plant.
Figure 4:
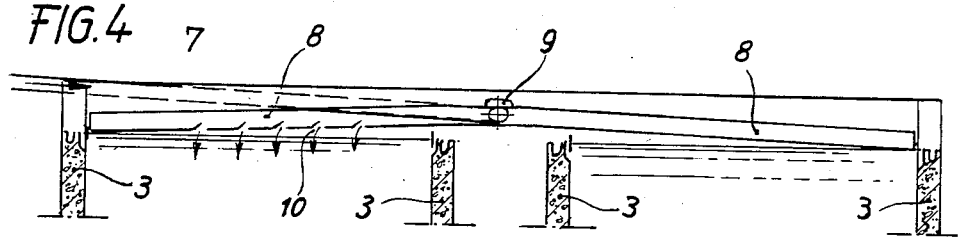
FIG. 4 is a vertical transverse sectional view taken on line 4—4 in FIG. 2.

It is apparent from FIG. 2 that the outlet openings 10 are not regularly spaced throughout the length of the inlet duct but are concentrated in its intermediate portion so that the sludge-containing water which has been supplied will not reach the overflow weir 12 immediately from the ends of the inlet duct. Because the partition 19 is also provided with an overflow bar 21, which is adjustable in height, the overflow velocity of the water is greatly reduced further so that any solids remaining in suspension will settle in the secondary clarifying tank 5.

The intermediate corridor 22 facilitates the skimming of scum from the surface of the water in the settling tanks 1 and also facilitates an exact adjustment of the overflow bars 12 and retaining bars 11.

I claim:

1. In a sludge settling plant comprising at least two juxtaposed settling tanks defined by a pair of longitudinal outer walls, at least one longitudinal inner wall, a continuous cross wall and opposite end walls; at least one collecting tank defined by a pair of longitudinal walls, said continuous cross wall and an end wall; flow channels connecting said settling tanks with said collecting tank respectively; overflow weirs arranged in a flow path between each one of the settling tanks and the collecting tank, an inlet duct extending crosswise between said pair of longitudinal outer walls of the settling tanks at one end thereof and connecting said settling tanks in parallel in the flow path, and discharge means connected with said collecting tank; the improvement comprising:

at least one valve to stop the supply of sludge to one of said two settling tanks while maintaining the supply to the other one of the two settling tanks, the inlet duct arranged at said cross wall between said two settling tanks and said collecting tank, the end walls of the settling tanks formed as inclined ramps trafficable by an excavator; said overflow weirs and said flow channels extending longitudinally along at least one of the outer and inner longitudinal walls of the settling tanks respectively; said flow channels being formed as troughs and being inclined downwardly toward the cross wall and passing through said cross wall.

2. A sludge settling plant according to claim 1, wherein the collecting tank extends only along part of the length of the cross wall, a pure water tank extending along the remaining part of the length of the cross wall and being separated from the collecting tank by a partition, which is parallel with the longitudinal walls and is provided with an overflow weir; and an inclined collecting trough being provided, which extends at the cross wall, the flow channels opening into said collecting trough, which opens into the collecting tank.

3. A sludge settling plant according to claim 1, wherein between said at least two settling tanks a man-sized corridor is provided.

4. A sludge settling plant according to claim 1, wherein the overflow weirs comprise overflow bars, with means for adjusting the bars in height and inclination.

5. A sludge settling plant according to claim 4, wherein said overflow bars and said flow channels are slightly inclined in opposite directions.

6. A sludge settling plant according to claim 1, wherein a scum-retaining bar precedes each one of the overflow weirs and extends longitudinally adjacent thereto.

7. A sludge settling plant according to claim 1, wherein each one of the trough-shaped flow channels is formed in one of said longitudinal walls of the settling tanks.

8. A sludge settling plant according to claim 4, wherein the inside upper edge of each one of said longitudinal walls of the settling tanks is provided with a recess, which accommodates at least the overflow bar.

* * * * *